(12) United States Patent
Lin

(10) Patent No.: US 9,213,373 B2
(45) Date of Patent: Dec. 15, 2015

(54) PORTABLE ELECTRONIC DEVICE

(71) Applicant: ShenZhen Treasure City Technology Co., LTD., ShenZhen (CN)

(72) Inventor: Chia-Huei Lin, New Taipei (TW)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 48 days.

(21) Appl. No.: 14/192,939

(22) Filed: Feb. 28, 2014

(65) Prior Publication Data

US 2014/0355192 A1 Dec. 4, 2014

(30) Foreign Application Priority Data

May 31, 2013 (TW) .............................. 102119316 A

(51) Int. Cl.
*G06F 1/16* (2006.01)
(52) U.S. Cl.
CPC .................................... *G06F 1/1669* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,793,606 | A * | 8/1998 | Cubbage et al. | 361/679.29 |
| 6,788,527 | B2 * | 9/2004 | Doczy et al. | 361/679.11 |
| 8,385,063 | B2 * | 2/2013 | Zhu et al. | 361/679.58 |
| 8,553,403 | B2 * | 10/2013 | Chang et al. | 361/679.2 |
| 8,896,998 | B2 * | 11/2014 | Moser | 361/679.29 |
| 8,953,310 | B2 * | 2/2015 | Smith et al. | 361/679.29 |
| 2002/0089190 | A1 * | 7/2002 | Wang et al. | 292/251.5 |
| 2009/0141439 | A1 * | 6/2009 | Moser | 361/679.29 |
| 2012/0050975 | A1 * | 3/2012 | Garelli et al. | 361/679.27 |
| 2014/0313665 | A1 * | 10/2014 | Delpier et al. | 361/679.55 |

* cited by examiner

*Primary Examiner* — Lisa Lea Edmonds
(74) *Attorney, Agent, or Firm* — Novak Druce Connolly Bove + Quigg LLP

(57) ABSTRACT

A portable electronic device includes a main body, a keyboard, and a connecting assembly connected between the main body and the keyboard. An electromagnetic module is mounted in the main body. The connecting assembly includes a latch member configured to latch the main body and a magnet module corresponding to the electromagnetic module. The magnet module is fixed to the latch member. When the electromagnetic module is powered off, the latch member is located at a first position and locks the main body to the connecting assembly. When the electromagnetic module is powered on, the electromagnetic module pushes the magnet module and the latch member to a second position, where the latch member is unlocked from the main body and the main body is detachable from the connecting assembly.

20 Claims, 8 Drawing Sheets

PORTABLE ELECTRONIC DEVICE

1. FIELD

The present disclosure relates to a portable electronic device.

2. BACKGROUND

A typical portable electronic device, such as a notebook computer, includes a display module and a keyboard module pivotably connected to the display module. However, during repairs or maintenance, the keyboard module is not easily detached from the display module.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 6 illustrates a second relative position of the electromagnetic module and the permanent magnet module of the portable electronic device of FIG. 1 when the electromagnetic module is powered on.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
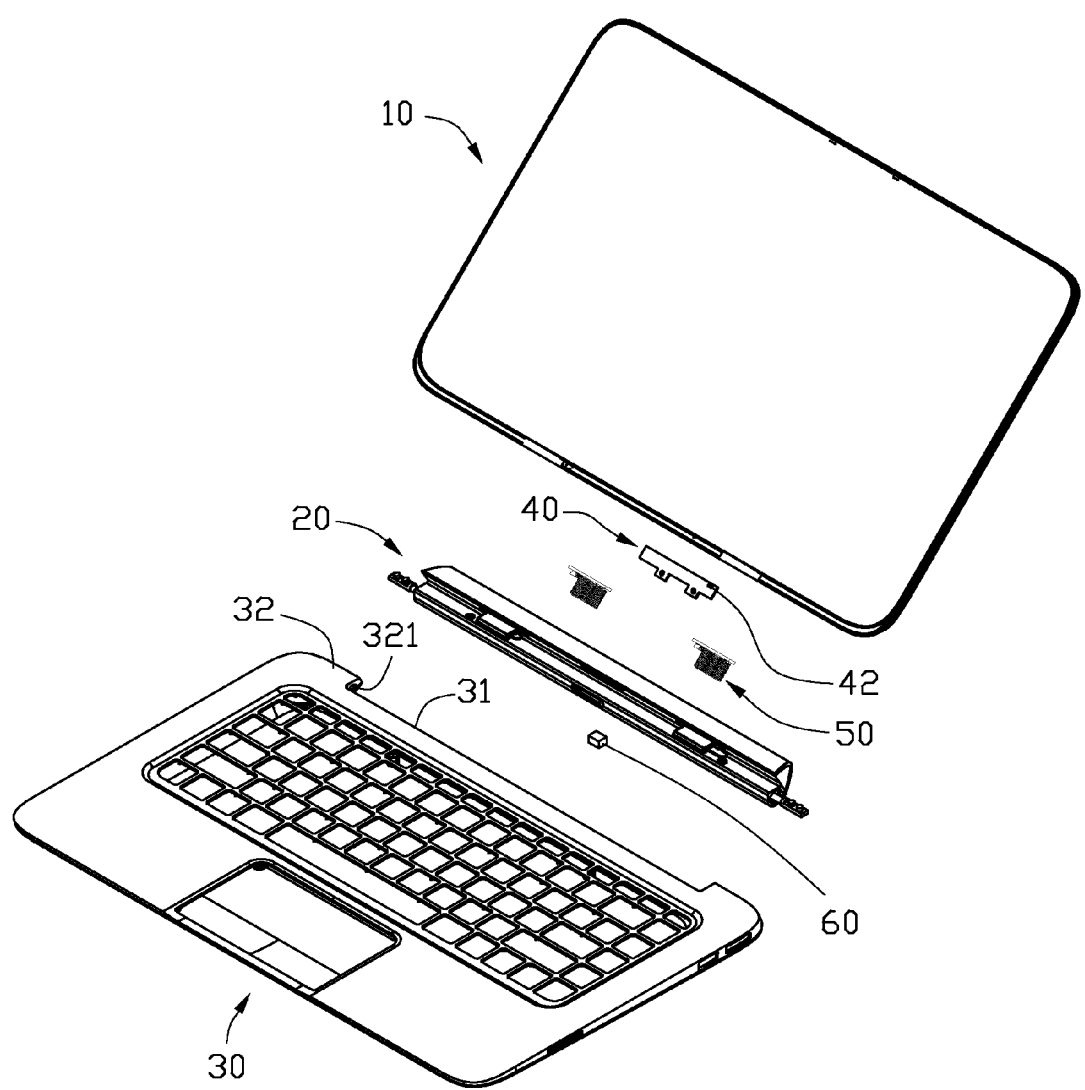
FIG. 1 is an exploded, isometric view of an embodiment of a portable electronic device.
Figure 2:
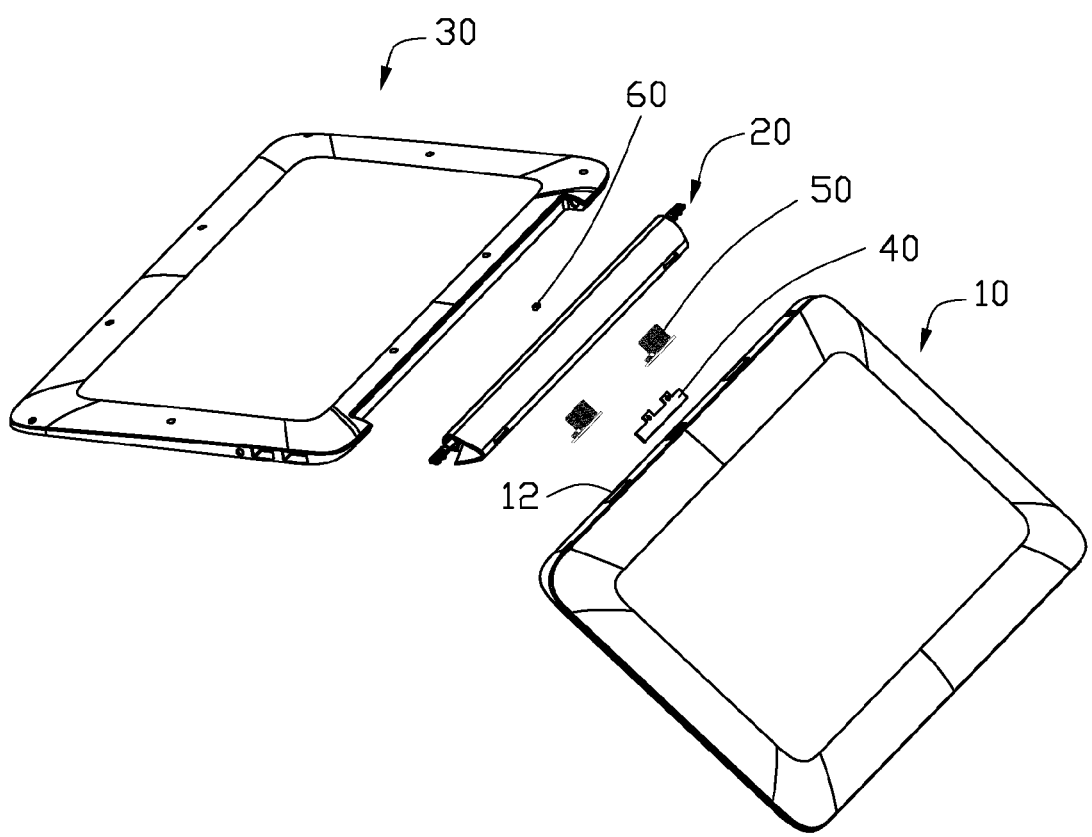
FIG. 2 is similar to FIG. 1, but viewed from another aspect.

FIGS. 1 and 2 illustrates an embodiment of an portable electronic device which includes a main body 10, a connecting assembly 20, a keyboard 30, a circuit board 40, a pair of electromagnetic modules 50, and a powerful magnet 60. The keyboard 30 can be pivotably connected to the main body 10 via the connecting assembly 20. In one embodiment, the main body 10 includes a motherboard and a display screen. The main body 10 can be used as a tablet personal computer.

A pair of mounting grooves 12 is defined in a bottom of the main body 10. The pair of electromagnetic modules 50 and the circuit board 40 can be mounted in the main body 10. A sensor 42 is mounted on the circuit board 40. In one embodiment, the sensor 42 is a Hall sensor.

The keyboard 30 includes a pair of protruding portions 32 and a hollow portion 31 located between the pair of protruding portions 32. A mounting slot 321 is defined in an inner side of each of the pair of protruding portions 32. The powerful magnet 60 can be mounted in the keyboard 30.

Figure 3:
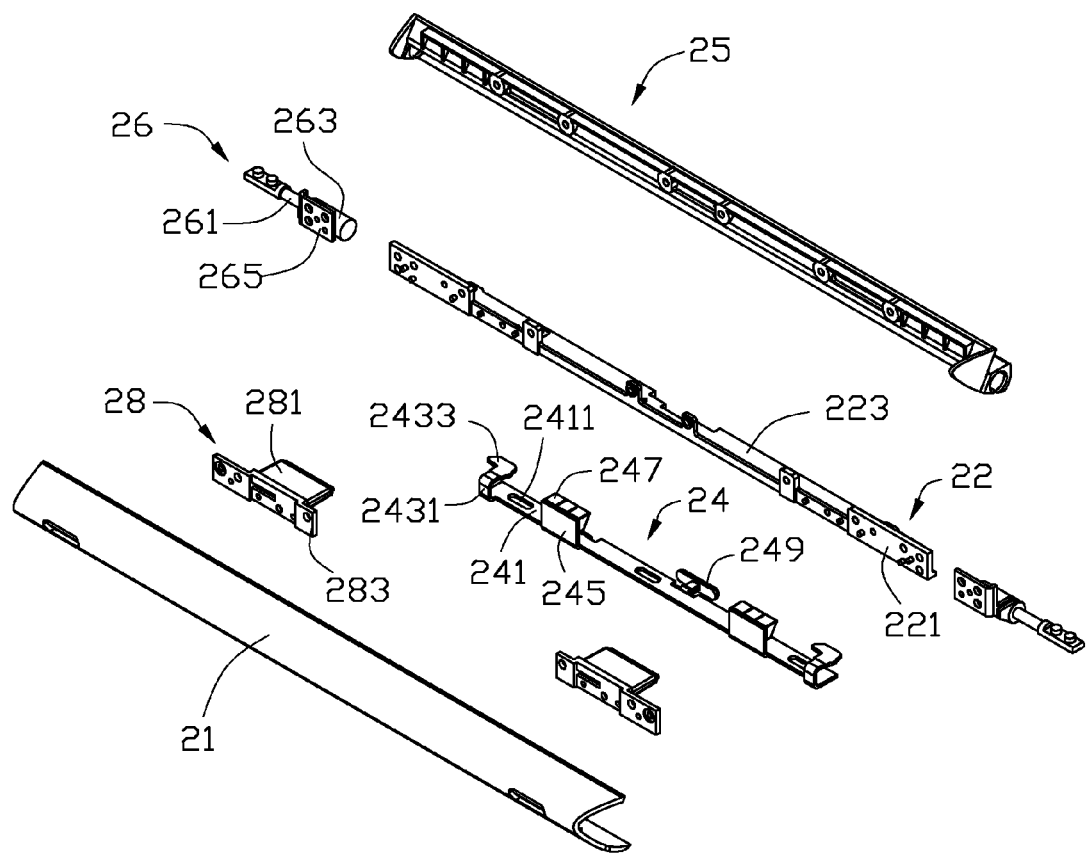
FIG. 3 is an exploded view of a connecting assembly of the portable electronic device of FIG. 1.
Figure 4:
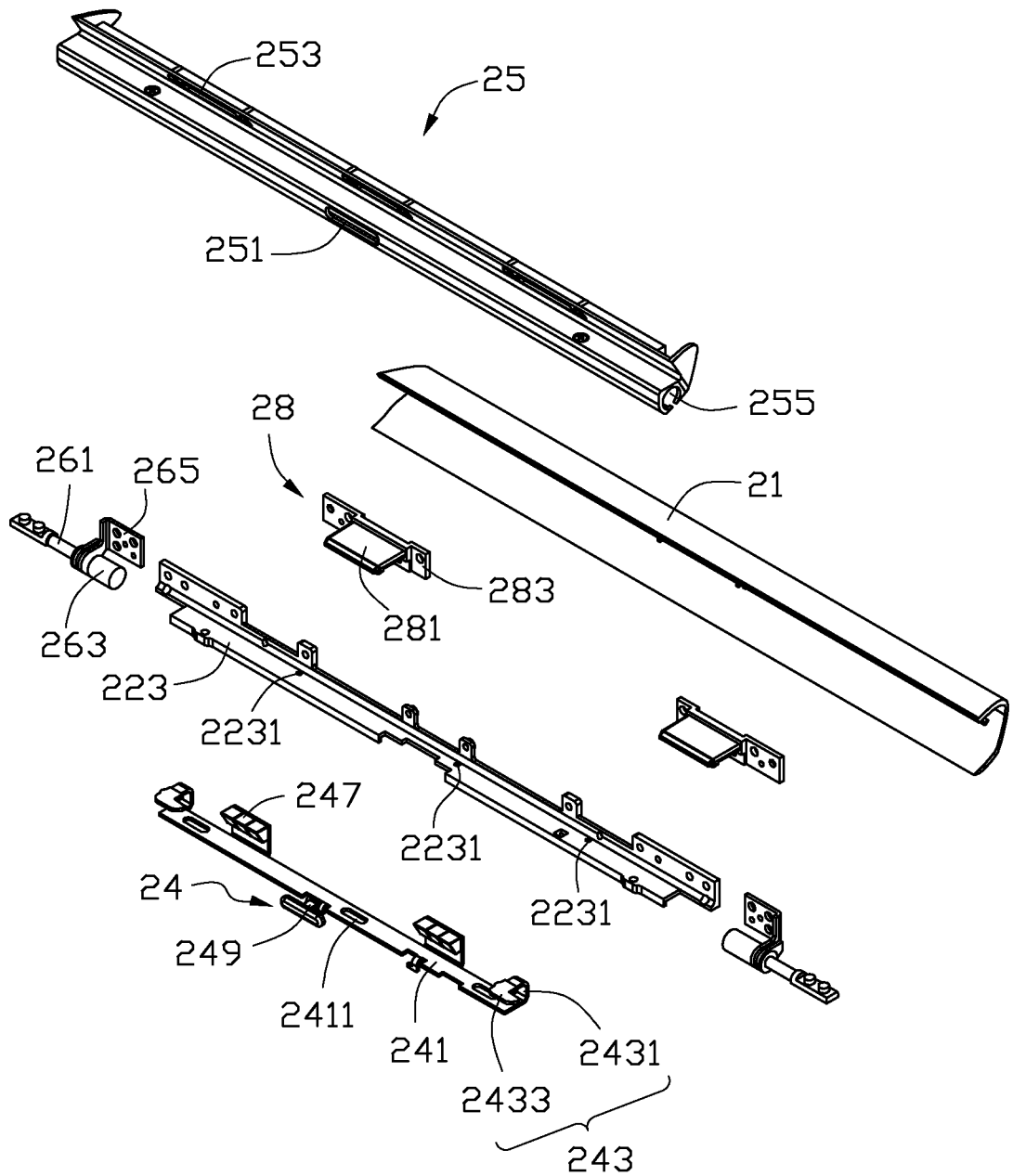
FIG. 4 is similar to FIG. 3, but viewed from another aspect.

FIGS. 3-4 show the connecting assembly 20 includes a first covering member 21, a second covering member 25, a connecting shaft 22, a latch member 24, a pair of pivot mounting members 26, and a pair of mounting members 28. The connecting shaft 22 includes a base plate 223 and a flange 221 extending from a side edge of the base plate 223. A plurality of mounting holes 2231 is defined in the base plate 223.

The first covering member 21 is curved and includes two panels connected to each other. An angle between the two panels is less than 90 degrees. A first sliding slot 251 is defined in the second covering member 25. A pair of grooves 253 is defined in the second covering member 25 corresponding to the pair of mounting members 28. A gap 255 having a circular arc shape is defined in each of two distal ends of the second covering member 25. The second covering member 25 can be attached to the first covering member 21 for encasing the connecting shaft 22 and the latch member 24.

The latch member 24 includes a base panel 241, a pair of latch portions 243, and a pair of mounting pieces 245. The pair of latch portions 243 extends from the base panel 241 and is located at two ends of the base panel 241. The pair of mounting pieces 245 extends substantially perpendicularly from the base panel 241 and is located between the pair of latch portions 243. Each of the pair of latch portions 243 includes a connecting flange 2431 extending substantially perpendicularly from the base panel 241 and a latch piece 2433 extending substantially perpendicularly from the connecting flange 2431. The latch piece 2433 has an L shape and substantially parallel to the base panel 241. A plurality of second sliding slots 2411 is defined in the base panel 241 corresponding to the plurality of mounting holes 2231. A permanent magnet module 247 is mounted on each of the pair of mounting pieces 245. A handle 249 extends from a central portion of the base panel 241. The handle 249 has a T shape. A length of the latch member 24 is less than that of the connecting shaft 22.

Each of the pair of pivot mounting members 26 includes a mounting rod 261, a shaft 263 pivotably attached to an outside of the mounting rod 261, and a mounting seat 265 attached to the shaft 263.

Each of the pair of mounting members 28 includes a base seat 283 and a connecting piece 281 substantially perpendicularly connected to the base seat 283. The connecting piece 281 can be mounted in each of the pair of mounting grooves 12.

In assembly of the connecting assembly 20, the mounting seat 265 is attached to the flange 221. The pair of pivot mounting members 26 is attached to two ends of the connected shaft 22. The base seat 283 is attached to the connecting shaft 22 and located between the pair of pivot mounting members 26. The connecting piece 281 is substantially parallel to the base plate 223. The base panel 241 abuts the base plate 223. The plurality of second sliding slots 2411 is aligned with the plurality of mounting holes 2231. A plurality of fasteners extends through the plurality of second sliding slots 2411 and the plurality of mounting holes 2231 for slidingly attaching the latch member 24 to the connecting shaft 22. The latch piece 2433 abuts the connecting piece 281. The connecting piece 281 and the latch piece 2433 extend through one of the pair of grooves 253. The handle 249 extends through the first sliding slot 251. The mounting rod 261 extends through the gap 255. Thus, the connecting assembly 20 is assembled.

The mounting rod 261 is mounted in the mounting slot 321. The connecting assembly 20 is pivotably attached to the keyboard 30 and located in the hollow portion 31. The connecting piece 281 and the latch piece 2433 are inserted in one of the pair of mounting grooves 12. The latch member 24 is slid along a protruding direction of the latch piece 2433. The latch piece 2433 protrudes from the connecting piece 281 and hooks on one of the pair of mounting grooves 12 for locking the main body 10 to the connecting assembly 20. The keyboard 30 is attached to the main body 10 via the connecting assembly 20. When the main body 10 is rotated relative to the keyboard 30, the mounting rod 261 is rotated in the shaft 263. In one embodiment, the electromagnetic module 50 and the circuit board 40 are mounted in the main body 10. The powerful magnet 60 is attached to the keyboard 30.

Figure 5:
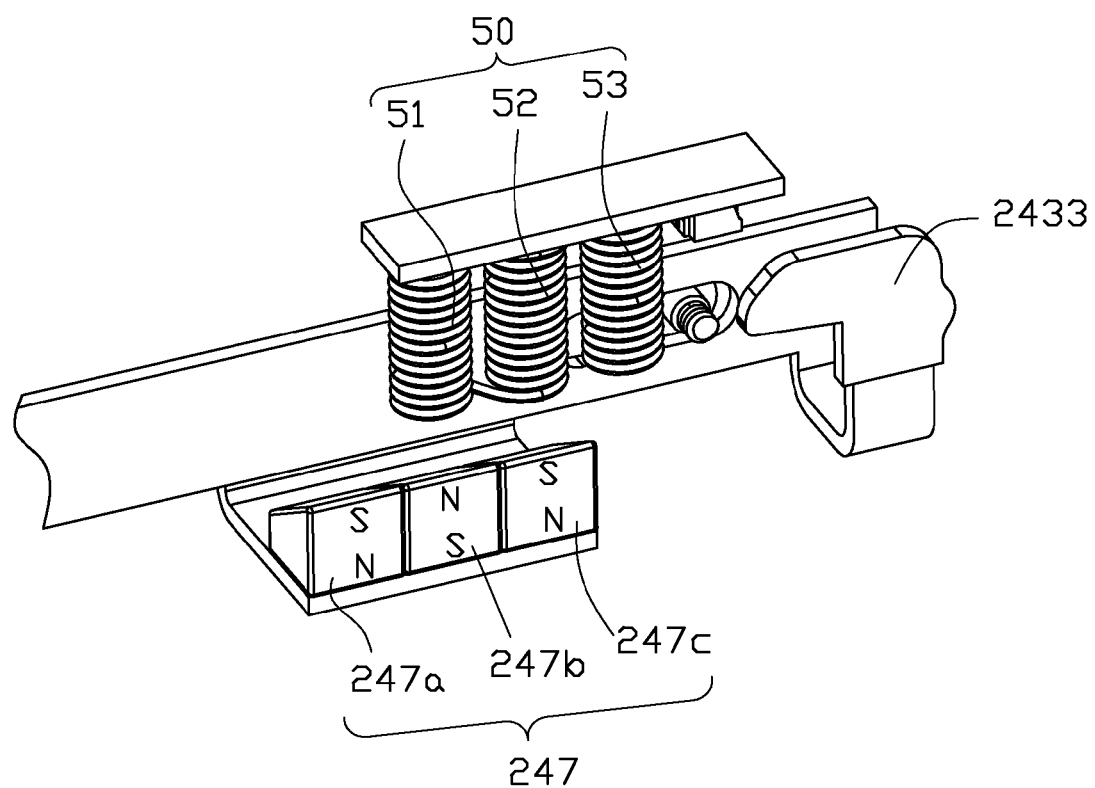
FIG. 5 illustrates a first relative position of an electromagnetic module and a permanent magnet module of the portable electronic device of FIG. 1 when the electromagnetic module is powered off.

FIG. 5 shows that each electromagnetic module 50 includes a first electromagnet 51, a second electromagnet 52, and a third electromagnet 53. The permanent magnet module 247 includes a first permanent magnet 247a, a second permanent magnet 247b, and a third permanent magnet 247c. A lower end of each of the first permanent magnet 247a and the third permanent magnet 247c is the north pole. An upper end of each of the first permanent magnet 247a and the third permanent magnet 247c is the south pole. A lower end of the second permanent magnet 247b is the south pole. An upper end of the second permanent magnet 247b is the north pole. When the electromagnetic module 50 is powered off, the first electromagnet 51, the second electromagnet 52, and the third electromagnet 53 do not generate magnetic field. The latch member 24 is in a first position relative to the electromagnetic module 50. The first electromagnet 51 is aligned with the second permanent magnet 247b. The second electromagnet 52 is aligned with the third permanent magnet 247c. The third electromagnet 53 is away from the permanent magnet module 247.

Figure 6:
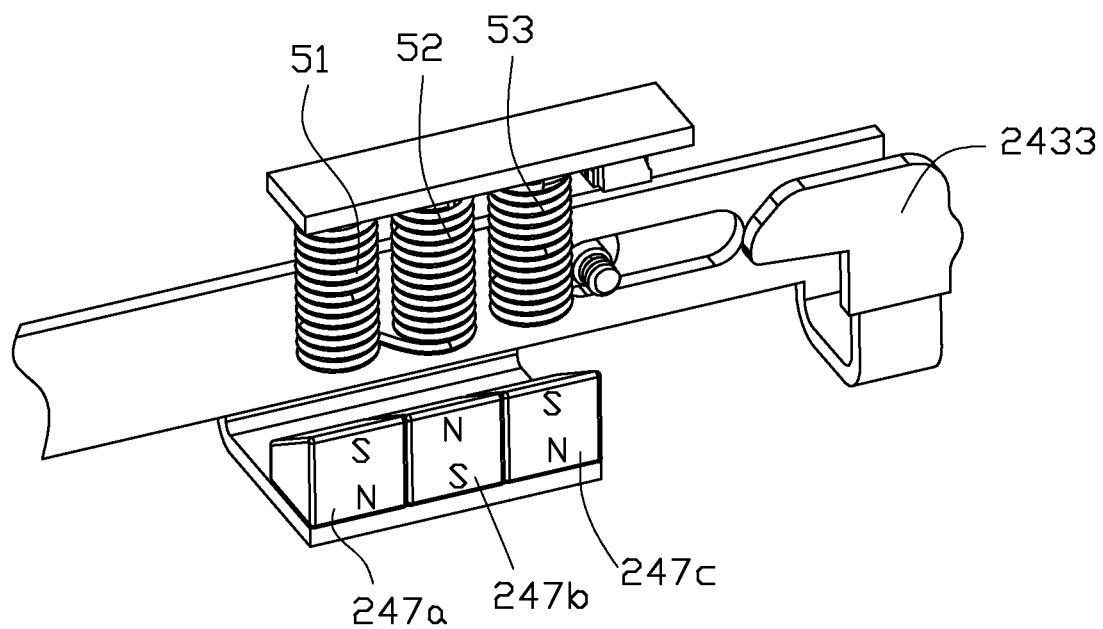

FIG. 6 shows that when the electromagnetic module 50 is powered on, the first electromagnet 51, the second electromagnet 52, and the third electromagnet 53 generate a magnetic field. In one embodiment, a lower end of each of the first electromagnet 51 and the third electromagnet 53 is the north pole. An upper end of each of the first electromagnet 51 and the third electromagnet 53 is the south pole. A lower end of the second electromagnet 52 is the south pole. An upper end of the second electromagnet 52 is the north pole. The electromagnetic module 50 pushes the permanent magnet module 247 and the latch member 24 to move along a direction that is opposite to the protruding direction of the latch piece 2433. The latch member 24 is pushed to a second position (see FIG. 6) from the first position (FIG. 5). The first electromagnet 51 is aligned with the first permanent magnet 247a. The second electromagnet 52 is aligned with the second permanent magnet 247b. The third electromagnet 53 is aligned with the third permanent magnet 247c.

Figure 7:
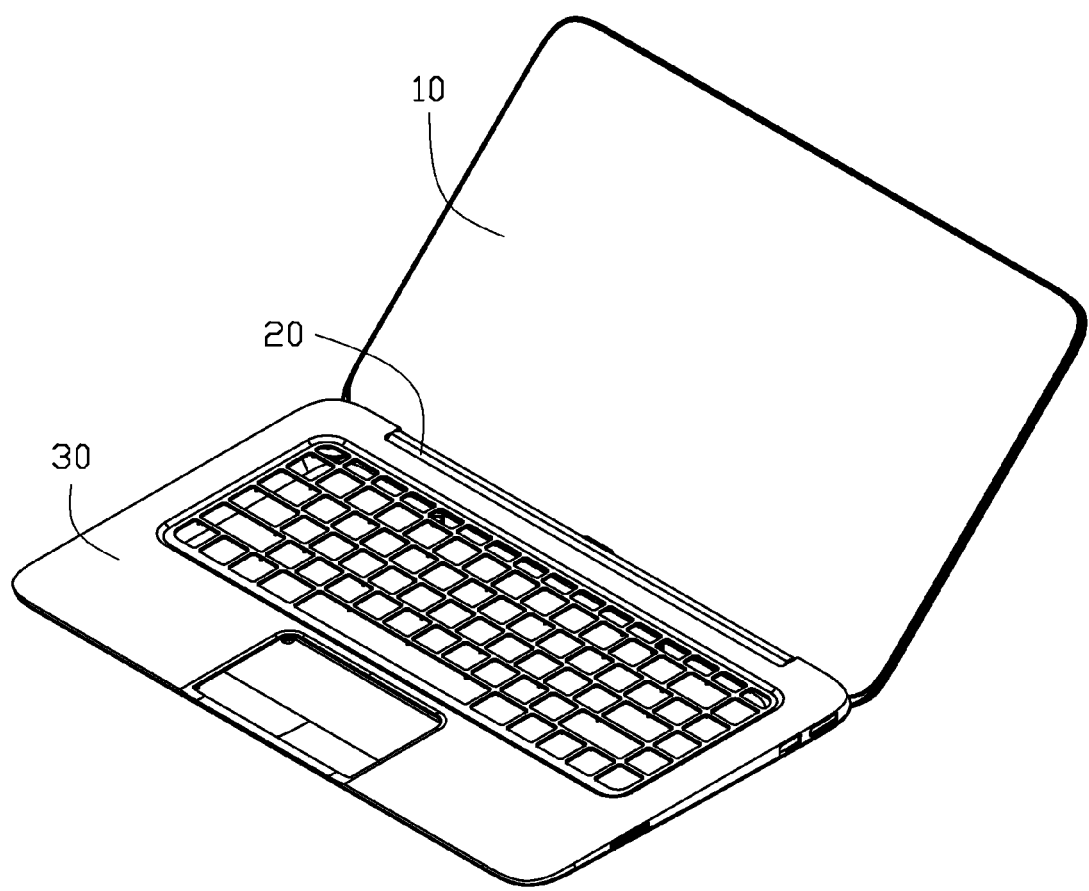
FIG. 7 is an assembled view of the portable electronic device of FIG. 1, showing a main body being rotated to a first angle.

FIG. 7 shows that the main body 10 is rotated to a first angle that is greater than a predetermined angle. The sensor 42 mounted in the main body 10 senses that a magnetic field intensity generated by the powerful magnet 60 is not greater than predetermined magnetic field intensity. The electromagnetic module 50 is powered off. The latch member 24 is in the first position (see FIG. 5). The latch piece 2433 stays hooks one of the pair of mounting grooves 12. The connecting assembly 20 and the keyboard 30 are locked to the main body 10. In one embodiment, the first angle is greater than 90 degrees. The predetermined angle is less than 90 degrees.

Figure 8:
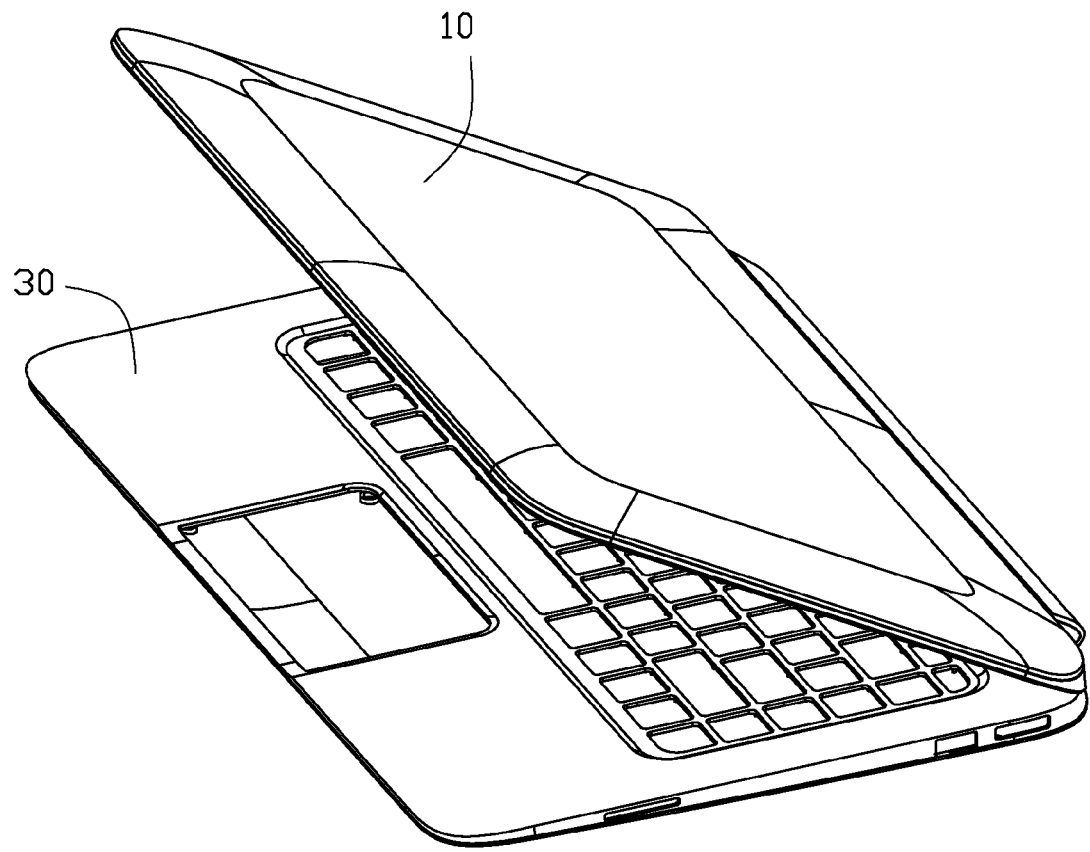
FIG. 8 is similar to FIG. 7, but showing the main body being rotated to a second angle.

FIG. 8 shows that the main body 10 is rotated to a second angle that is not greater than the predetermined angle. The sensor 42 mounted in the main body 10 becomes nearer to the powerful magnet 60 and senses that a magnetic field intensity generated by the powerful magnet 60 is greater than a predetermined magnetic field intensity, and the circuit board 40 sends a signal to the main body 10 to power on the electromagnetic module 50. The electromagnetic module 50 generates magnetic fields and pushes the permanent magnet module 247 and the latch member 24 moving from the first position (See FIG. 5) to the second position (see FIG. 6). The latch piece 2433 is unlocked from one of the pair of mounting grooves 12. The connecting assembly 20 and the keyboard 30 can be detached from the main body 10.

When the electromagnetic module 50 is powered off, the electromagnetic module 50 can not push the permanent magnet module 247 and the keyboard 30 to the second position automatically. The handle 249 can be pushed to move the latch member 24 to the second position for detaching the main body 10 from the connecting assembly 20 manually.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. A portable electronic device, comprising:
a main body;
an electromagnetic module mounted in the main body;
a keyboard; and
a connecting assembly connected between the main body and the keyboard; the connecting assembly comprising a latch member and a permanent magnet module corresponding to the electromagnetic module; the permanent magnet module being fixed to the latch member;
wherein when the electromagnetic module is powered off, the latch member is located at a first position and locks the main body to the connecting assembly; and when the electromagnetic module is powered on, the electromagnetic module pushes the permanent magnet module and the latch member to a second position, where the latch member is unlocked from the main body and the main body is detachable from the connecting assembly.

2. The portable electronic device of claim 1, wherein at least one mounting groove is defined in a bottom of the main body, the latch member comprises at least one latch portion corresponding to the at least one mounting groove; when the latch member is in the locked position, the latch portion hooks the at least one mounting groove, and when the latch member is in the unlocked position, the latch portion is unlocked from the at least one mounting groove.

3. The portable electronic device of claim 2, wherein the latch member includes a base panel, the at least one latch portion comprises a connecting flange extending substantially perpendicularly from the base panel and an L-shaped latch piece extending substantially perpendicularly from the connecting flange.

4. The portable electronic device of claim 2, wherein the connecting assembly comprises a connecting shaft, and the latch member is slidably attached to the connecting shaft.

5. The portable electronic device of claim 4, wherein the connecting assembly comprises at least one pivot mounting member, the pivot mounting member comprises a mounting rod attached to the keyboard, a shaft pivotably attached to an outside of the mounting rod, and a mounting seat that is attached to the shaft and secured to the connecting shaft.

6. The portable electronic device of claim 5, wherein the connecting assembly comprises a first covering member and a second covering member for encasing the connecting shaft and the latch member, a gap is defined in each of two distal ends of the second covering member, and the mounting rod extends through and protrudes from the gap.

7. The portable electronic device of claim 6, wherein a handle extends from the latch member, a sliding slot is defined in the second covering member, and the handle is extended through the sliding slot and slidable along the sliding slot.

8. The portable electronic device of claim 6, wherein at least one groove is defined in the second covering member, the at least one latch portion is inserted through the at least one groove and mounted in the at least one mounting groove.

9. The portable electronic device of claim 1, wherein the keyboard comprises a magnet, the main body comprises a circuit and a sensor mounted on the circuit that is capable of sensing a magnetic field intensity generated by the magnet; when the main body is rotated to a first angle that is greater than a predetermined angle, the electromagnetic module is powered off; and when the main body is rotated to a second angle that is not greater than the predetermined angle, the electromagnetic module is powered on by the circuit board.

10. The portable electronic device of claim 8, wherein the first angle is greater than 90 degrees; and the predetermined angle is less than 90 degrees.

11. A portable electronic device, comprising:
a main body;
a keyboard comprising a magnet;
an electromagnetic module mounted in the main body;
a circuit board mounted in the main body and comprising a sensor capable of sensing a magnetic field intensity generated by the magnet; and
a connecting assembly pivotably connected to the keyboard; the connecting assembly comprising a latch member and a permanent magnet module corresponding to the electromagnetic module; the permanent magnet module being fixed to the latch member,
wherein when an angle between the main body and the keyboard is greater than a predetermined angle, the sensor senses that the magnetic field intensity generated by the magnet is not greater than a predetermined magnet field intensity, the electric magnet module is powered off, and the latch member is located in a locked position for locking main body to the connecting assembly; and
when an angle between the main body and the keyboard is not greater than a predetermined angle, the sensor senses that the magnetic field intensity generated from the block magnet is greater than a predetermined magnetic field intensity, and the electromagnetic module is powered on and pushes the permanent magnet module and the latch member to an unlocked position, where the latch member is disengaged from the main body for allowing detachment of the main body from the connecting assembly.

12. The portable electronic device of claim 11, wherein at least one mounting groove is defined in a bottom of the main body, the latch member comprises at least one latch portion corresponding to the at least one mounting groove; when the latch member is in the locked position, the latch portion hooks the at least one mounting groove, and when the latch member is in the unlocked position, the latch portion is unlocked from the at least one mounting groove.

13. The portable electronic device of claim 12, wherein the latch member includes a base panel, the at least one latch portion comprises a connecting flange extending substantially perpendicularly from the base panel and an L-shaped latch piece extending substantially perpendicularly from the connecting flange.

14. The portable electronic device of claim 12, wherein the connecting assembly comprises a connecting shaft, and the latch member is slidably attached to the connecting shaft.

15. The portable electronic device of claim 14, wherein the connecting assembly comprises at least one pivot mounting member, the pivot mounting member comprises a mounting rod attached to the keyboard, a shaft pivotably attached to an outside of the mounting rod, and a mounting seat that is attached to the shaft and secured to the connecting shaft.

16. The portable electronic device of claim 15, wherein the connecting assembly comprises a first covering member and a second covering member for encasing the connecting shaft and the latch member, a gap is defined in each of two distal ends of the second covering member, and the mounting rod extends through and protrudes from the gap.

17. The portable electronic device of claim 16, wherein a handle extends from the latch member, a sliding slot is defined in the second covering member, and the handle is extended through the sliding slot and slidable along the sliding slot.

18. The portable electronic device of claim 16, wherein at least one groove is defined in the second covering member, the at least one latch portion is inserted through the at least one groove and mounted in the at least one mounting groove.

19. The portable electronic device of claim 16, wherein the first covering member has an arc shape and is attached to the second covering member.

20. The portable electronic device of claim 11, wherein the sensor is a Hall sensor.

* * * * *